June 26, 1956  R. F. GRISWOLD  2,751,610
PNEUMATIC CUSHIONS
Filed Sept. 9, 1954  4 Sheets-Sheet 1
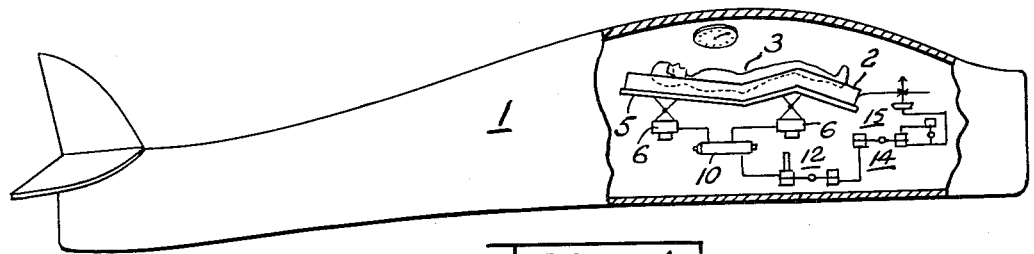
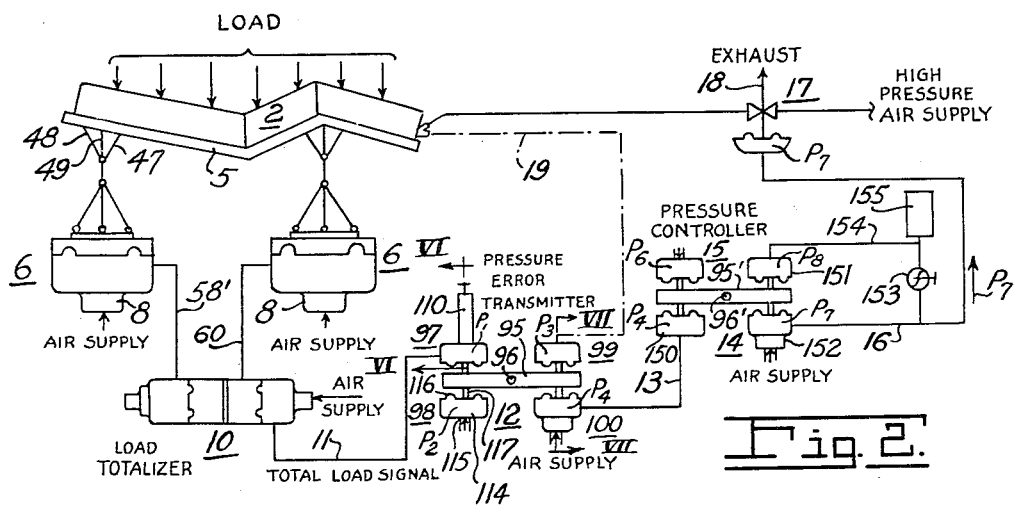
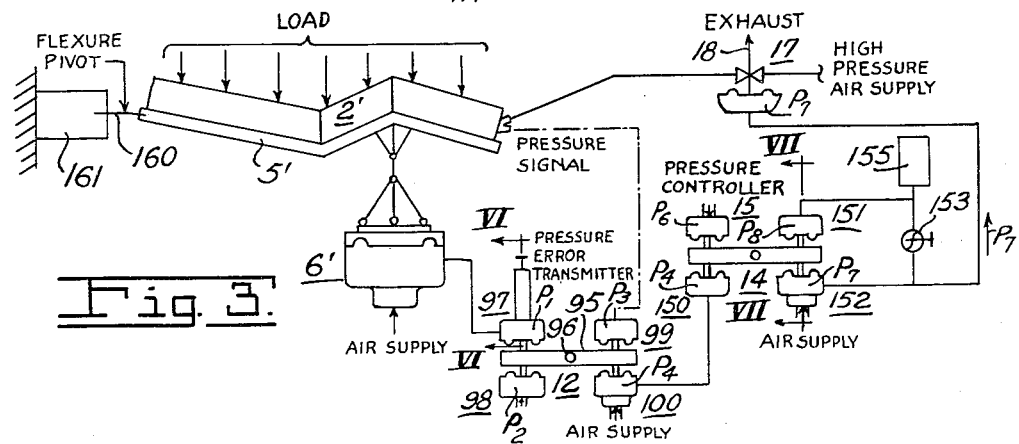
INVENTOR.
RAY F. GRISWOLD
BY Zugelter & Zugelter
Attys.

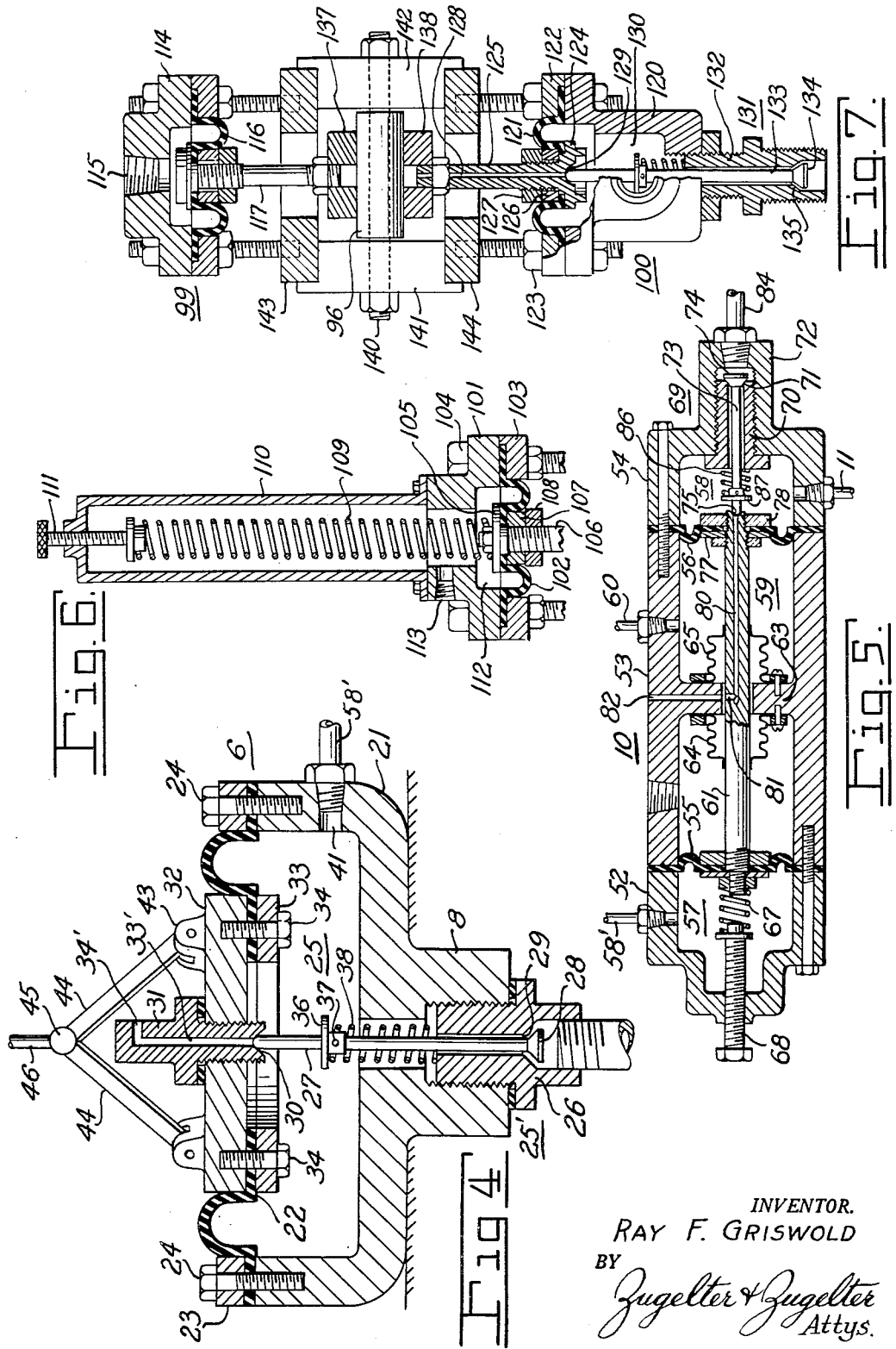

INVENTOR.
RAY F. GRISWOLD

INVENTOR.
RAY F. GRISWOLD
BY Zugelter & Zugelter
Attys.

United States Patent Office 2,751,610
Patented June 26, 1956

2,751,610

PNEUMATIC CUSHIONS

Ray F. Griswold, Castle Shannon, Pa., assignor to Hagan Corporation, Pittsburgh, Pa., a corporation of Pennsylvania Application September 9, 1954, Serial No. 454,996

11 Claims. (Cl. 5—348)

This invention relates to pressurized cushions as for example "G" cushions for the operators of rockets, planes and the like, which are capable of high rates of acceleration, and for other purposes.

An object of this invention is to provide a "G" cushion for the operator of rockets, planes and the like, which are capable of high rates of acceleration, in which the cushion is inflated in proportion to the change in apparent weight of the operator on the cushion during acceleration.

Another object of the invention is to provide a "G" cushion with means for measuring the apparent weight of the operator on the cushion, and controlling the inflation pressure of the cushion in accordance with changes in the apparent weight of the operator while in flight.

A still further object of the invention is to provide a "G" cushion of the type set forth in the next preceding object, with means for adjusting the ratio of the apparent weight of the operator to the inflation pressure.

Still another object of the invention is to provide a pressure cushion in which delicate instruments or other apparatus may be crated and shipped, the cushion being provided with means for automatically adjusting the pressure in the cushion in accordance with apparent weight changes produced by changes in acceleration of motion of the crate, to prevent bottoming of the article protected by the cushion.

Other objects of the invention will be apparent to those of ordinary skill in the art to which the invention pertains, from the following description taken in conjunction with the accompanying drawings.

In the drawings:

Figure 1 is a more or less diagrammatic view of a flying machine, such as a rocket, plane or the like, illustrating the pilot on a "G" cushion which is provided with means for controlling the inflation pressure to the cushion in accordance with the apparent weight of the operator on the cushion during acceleration or deceleration.

Fig. 2 is a more or less diagrammatic view of the "G" cushion and the means for measuring the apparent weight of the operator on the cushion, and controlling the inflation pressure supplied the cushion in accordance with the apparent weight of the pilot, means being provided in the apparatus for adjusting the ratio of apparent weight to the value of inflating pressure;

Fig. 3 is a view similar to Fig. 2, but showing a modified form of support for the "G" cushion;

Fig. 4 is a view in section of a thrust-measuring device embodied in the systems of Figs. 1, 2 and 3;

Fig. 5 is a view in section of a totalizing relay embodied in the systems of Figs. 1 and 3;

Fig. 6 is a view in section, taken on lines VI—VI of Figs. 2 and 3;

Fig. 7 is a view in section, taken on lines VII—VII of Figs. 2 and 3;

Figure 9:
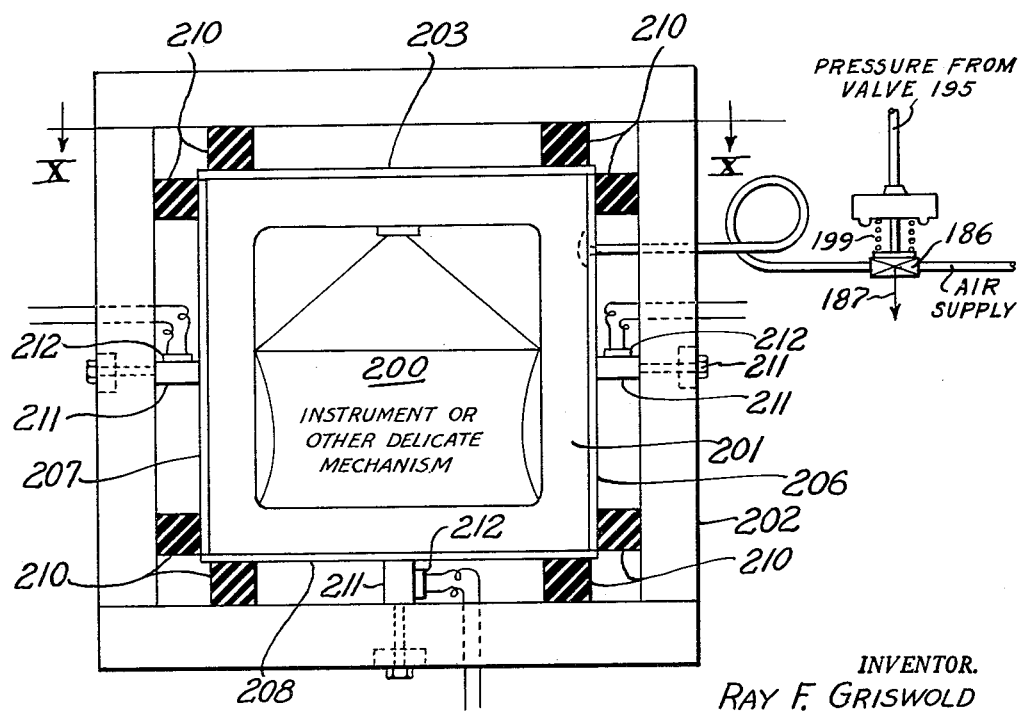
Figure 10:
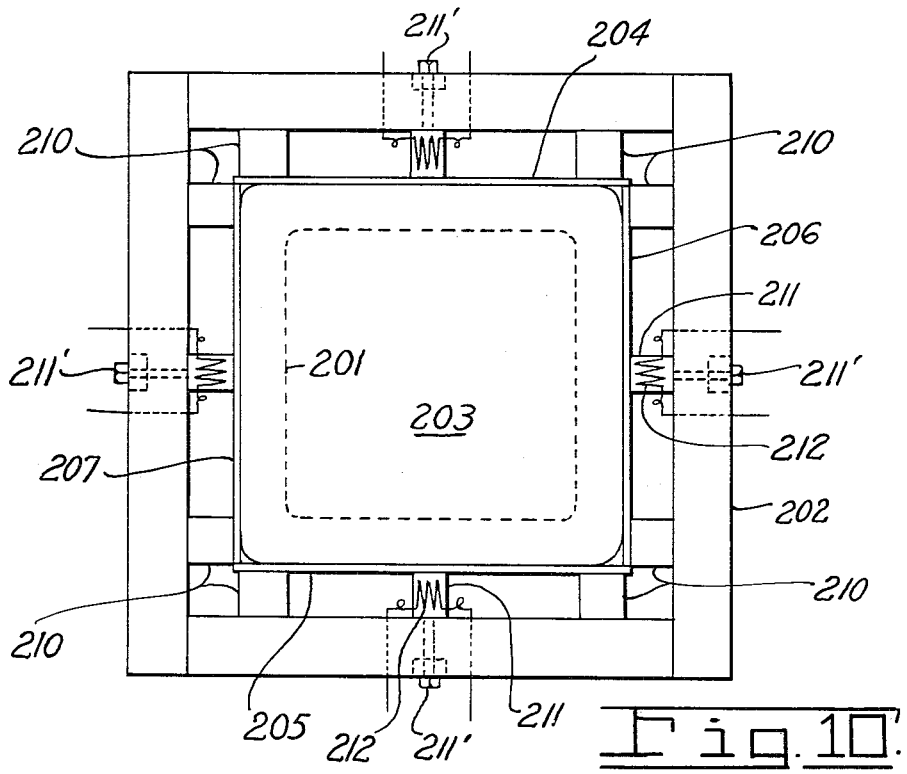

Fig. 9 is a more or less schematic view of a crate having therein a pneumatic cushion within which delicate instruments or other sensitive mechanism may be placed, electrical mechanism being provided for detecting apparent weight changes and shifts in the load, said electrical mechanism operating to adjust the pressure in the cushion to prevent bottoming of the instrument or other sensitive mechanism;

Fig. 10 is a view taken on line X—X of Fig. 9; and

Figure 11:
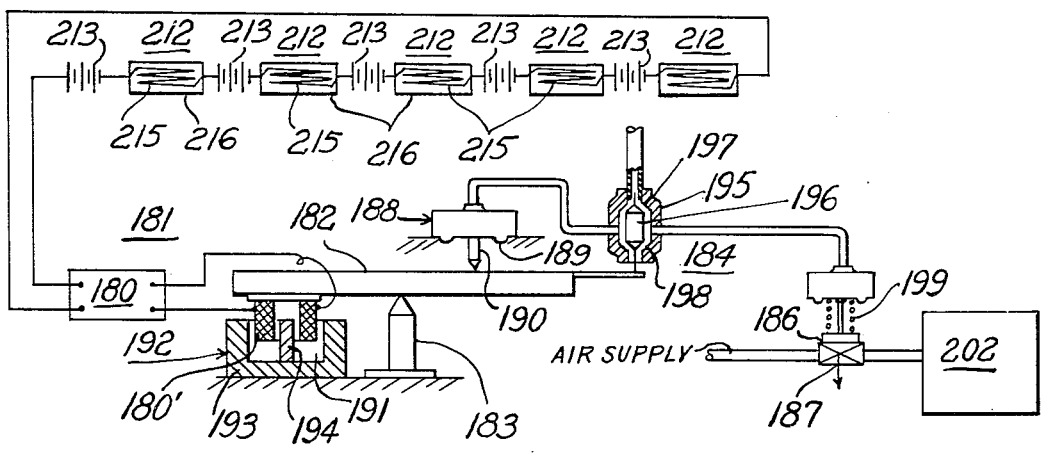

Fig. 11 is a more or less diagrammatic view of a plurality electric strain gauges and an electro-magnetic pneumatic convertor for adjusting the pressure in the cushion in accordance with the strain recorded by the strain gauges.

Throughout the specification the term "G cushion" is used. The letter "G" in that term has reference to a unit of accelerating force equal to that of gravity. Thus forces produced by rates of acceleration or deceleration greater than gravity are expressed in multiples of "G" as 1, 2 or more G's. The term "G cushion," therefore, has reference to a device upon which the load varies in relation to multiples of unit acceleration of gravity.

In Fig. 1 of the drawings is illustrated schematically a flying machine which, for purposes of illustrating the invention, may be a rocket, jet plane or other aircraft that is capable of high rates of acceleration. The machine 1 is provided with an inflatable "G" cushion 2, on which the operator or pilot 3 rides in a reclining position. As illustrated, the cushion 2 is supported at a location under the head of the operator, and under the break of the knees on a platform 5. The platform 5, in turn, is supported on a pair of thrust-measuring devices 6, each of which is loaded in accordance with the apparent weight of the pilot.

While the pilot is shown as lying lengthwise of the aircraft it is to be understood that the normal position would be transverse thereof. The pilot is shown in the lengthwise position to simplify illustration.

Each thrust device 6 is provided with a source of supply of compressed air at constant pressure, the same being connected to valve housings 8 thereof. Devices 6 are so constructed that, for any given load or thrust, an air pressure is established in each device that balances the particular value of load or thrust applied to it at any instant. Devices 6 are illustrated in detail in Fig. 4. Each device 6 transmits the balancing air pressure to a totalizing relay 10 which, in turn, transmits an output pressure through a pipe 11 to a pressure-error transmitter relay 12. The pressure-error relay 12 transmits an output pressure through a pipe 13 to a regulator 14. The regulator 14 responds to that output pressure and to a loading pressure supplied to a pressure element 15 in device 14, and causes an output pressure to be delivered through a pipe 16 to a diaphragm-operated valve 17. The diaphragm-operated valve 17 is arranged to supply air at relatively high pressure to the "G" cushion 2 as increasing pressures are required, and to exhaust 18 when it is necessary to reduce the pressure in the "G" cushion. The "G" cushion has an outlet pipe or conduit 19, that communicates the pressure established in the "G" cushion to the error transmitter relay 12. The relationship of the output pressure deliverd by the totalizing relay 10 to dvice 12, and the "G" cushion pressure delivered through pipe 19, determines the value of the output pressure delivered to the regulator 14.

When a machine, such as that illustrated in Fig. 1, is taking off into the atmosphere at high rates of acceleration, the operator or pilot is in reclining position on the cushion. The rate of acceleration determines the load or apparent weight of the pilot, and that apparent weight is transmitted to the thrust devices 6. The pressure required to balance the load on the "G" cushion is totalized by relay 10 which, in turn, transmits an output pressure to the pressure-error transmitter 12. The transmitter, in turn, transmits an output pressure to the regulator 14 whereby the pressure in the "G" cushion, as controlled by diaphragm valve 17, is regulated by, and in accordance with, the value of the apparent weight of the pilot on the cushion at any instant in flight.

The construction of the thrust-measuring devices 6 may be as shown in Fig. 4. As there illustrated, each device 6 includes a housing 21 which is open across one side. That opening is closed by a diaphragm 22. The marginal edge of the diaphragm is clamped between a ring 23 and the housing 21 by means of screws 24.

The air pressure to the chamber 25 is supplied by a valve 25' in housing 8. Valve 25' comprises a valve body 26 that is screwed into the valve housing 8 and a valve stem 27. The outer end of the valve stem is provided with a valve member 28 that seats on an inlet port 29. The inner end of the valve stem 27 seats in a valve seat 30 formed in a member 31. Member 31 is screwed into a backing plate 32. The central portion of the diaphragm 22 is clamped between the backing plate 32 and a clamp ring 33 by means of screws 34. Member 31 is also provided with a central bore 33' and a side bore 34', that provides communication between the pressure chamber 25 and the atmosphere when the exhaust seat 30 is uncovered. The valve stem 27 is provided with a flanged collar 36, that is secured thereto by means of a pin 37, and a light compression spring 38 disposed between the collar and the inner end of the valve body 26. Spring 38 urges the valve stem 27 in a direction in which the inlet port 29 is closed.

When the pressure in chamber 25 is of such a value that the total force of that pressure on the diaphragm is equal to the external force applied to it, the diaphragm will be in balance with the force. At that time, both the exhaust port and the inlet port will be closed to trap the air in the chamber. The pressure thus trapped in the chamber 25 balances the applied load.

If the load increases the inlet port 29 is uncovered, the exhaust port 30 remaining closed, whereby the pressure in chamber 25 is increased until the load is balanced, at which time the inlet port is again closed.

If the applied load on the diaphragm decreases, the pressure in chamber 25 will lift the diaphragm and the exhaust port 30 off the end of the valve stem 27 and bleed air to the atmosphere until the pressure is reduced to a value at which it balances the applied load. The housing 21 is provided with an outlet port 41, to which a pipe 42 is connected. Pipe 42 leads to the totalizing relay 10.

As shown in Fig. 4, and schematically in Figs. 1, 2 and 3, the thrust plate or backing member 32 is provided with ears or lugs 43 spaced preferably 120° apart for accommodating struts 44. The upper ends of the struts are connected to a pin 45. That pin is connected by a link 46 to thrust links 48, 49 and 50, which are also arranged 120° apart, and these, in turn, are attached to the under side of the platform on which the cushion 2 is supported.

From the above description, it will be apparent that devices 6 measure the thrust applied to them, and develop automatically, balancing air pressures that are transmitted to the totalizing relay 10, and that relay develops an output pressure that is proportional to the sum of the output pressures from devices 6. The totalizing relay 10 is illustrated in Fig. 5.

Relay 10 comprises a housing composed of sections 52, 53 and 54, mounted tandem-wise, the sections 52 and 54 being bolted to the ends of section 53. Members or sections 52 and 54 form end housings. Diaphragms 55 and 56 are clamped between housings 52 and 54 and the adjacent ends of section 53, as shown, to provide pressure chambers 57 and 58. Pressure is supplied to chamber 57 by one of the thrust-measuring devices 6 through a pipe 58', and pressure is transmitted from the other thrust device 6 to chamber 59 of the relay 10 through a pipe 60.

As illustrated, diaphragms 55 and 56 are connected by a rod 61 that passes through a partition wall 63 in section 53. The opening through which the rod passes is sealed by flexible seals 64 and 65, the ends of the seals being secured, by brazing or soldering, to the rod and to the partition, respectively.

The diaphragms 55 and 56 may be urged in one direction by a spring 67 and an adjusting screw 68, which is threaded through section 52, as shown, for adjusting the spring tension.

Section 54 of the relay is provided with a valve 69 that comprises a valve body 70 having an inlet port seat 71. The body 70, as shown, is screwed into a neck 72 of section 54. The valve also includes a valve stem 73 having a valve element 74 at its outer end disposed to control the inlet port 71. The opposite end of the stem is arranged to seat on an exhaust port seat 75. As shown, the exhaust port seat 75 is formed in the end of rod 61. The rod 61 is secured to diaphragm 65 by means of a backing plate 77 and a nut 78 threaded on the end of the rod in which the exhaust seat 75 is formed. The rod 61 is drilled to provide a bore 80 leading from the exhaust port seat 75 to a side bore 81 which, in turn, communicates with a side bore 82 in partition 63. The side bores 82 and 81 and bore 80 provide communication between the atmosphere and chamber 58.

A supply pipe 84 is connected to the valve housing or neck 72, by means of which air pressure at a constant predetermined value may be supplied to the inlet port 71 of the valve. The valve is urged in a direction to cause element 74 to seat on the inlet port seat by means of a spring 86 placed between a collar 87 and the adjacent end of the valve body 70.

If the pressure supplied through pipes 58' and 60 to chambers 57 and 59 is atmospheric, and the spring tension of spring 67 is suitably adjusted, the pressure in chamber 58 will also be atmospheric. However, if pressure is supplied by either or both of pipes 58' and 60 to chambers 57 and 59, the diaphragms 55 and 56 will deflect towards the right, thereby shifting rod 61 with them towards the right and lifting the valve element 74 off the inlet port seat 71. Air pressure will then flow into chamber 58 until the pressure in that chamber exerts a total force on diaphragm 56 that balances the total force exerted by the pressures in chambers 57 and 59 on diaphragms 55 and 56. When these forces are thus in balance, the inlet port 71 and the exhaust port 75 will be closed by valve element 74 and the end of the valve stem 73, respectively. Thus, for every value of pressure in either chamber 57 or 59, or for every value of total pressure in those chambers, there will be established in chamber 58 a pressure that is proportional to the sum of the pressures delivered to chambers 57 and 59.

If the tension of spring 67 is adjusted so that the rod 61 is urged towards the right, a pressure will be established in chamber 58 that is sufficient to balance the spring force. Therefore, if the pressures delivered to chambers 57 and 59 by pipes 58' and 60 increase either singly or together, the total pressure in chamber 58 will be proportional to the initial pressure required to balance the spring force and the sum of the pressures in chambers 57 and 59.

The pressure established in chamber 58 required to balance the pressures in chambers 57 and 59, is transmitted through outlet pipe 11 to the pressure-error transmitter relay 12.

The pressure-error transmitter relay 12 comprises a beam 95 mounted on a double-acting fulcrum 96, a pressure-receiving unit 97 connected to pipe 11, a pressure-receiving unit 98, a pressure-receiving unit 99, and a pressure-sending unit 100. Unit 97 is illustrated more in detail in Fig. 6, and comprises a diaphragm housing 101 having across the same a diaphragm 102, that is clamped to the housing by means of a ring 103 and bolts 104. The center of the diaphragm is clamped between the head 105 of a bolt 106, and a clamping ring 107 and nut 108. A spring 109 is attached to the head of the bolt 106, and is disposed within a pressure-tight housing 110. The upper end of the spring is secured to a screw-threaded member 111, that is threaded through the top of the housing 110, as shown. The pressure is delivered by pipe 11 into diaphragm chamber 112, through a port 113. The tension in spring 109 may be adjusted so as to oppose the pressure acting on diaphragm 102 by a predetermined amount, according to the adjustments required by the system.

Unit 98 comprises a housing 114 having an inlet port 115 and a flexible diaphragm 116, acting through a push rod 117 on beam 95, in opposition to the force exerted thereon by diaphragm 102.

Pressure unit 98 may be subjected to a constant loading pressure, or it may be left open to the atmosphere, according to requirements. If a pressure of constant value is supplied to the diaphragm chamber of unit 98, the force exerted on beam 95 will subtract from, or oppose, the net force exerted by unit 97 on the beam.

Unit 99 is like unit 98, and is supplied with pressure through pipe 19 from the "G" cushion 2. The force exerted by the diaphragm of unit 99 acts on beam 95 in the same direction as the diaphragm of unit 97 acts on the beam. Therefore, if the forces exerted by these diaphragms on the beams are equal, and the lever arms to the fulcrum 96 are equal, these forces, or the turning moments of these forces, will balance each other.

Unit 100 comprises a housing 120 having, across the open face thereof, a diaphragm 121, the marginal edge of which is clamped to the housing by a ring 122 and bolts 123. The central portion of the diaphragm is clamped between the head 124 of a bolt 125, and a clamp ring 126 and nut 127, respectively. The bolt has a central bore 128 that terminates in a valve seat 129 in the head of the bolt, to provide communication between the atmosphere and the chamber 130 of the housing 120. Unit 120 is provided with a valve 131, that comprises a body 132 that is screwed into the end of the housing 120, and a valve stem 133 within the valve body. The valve stem is provided at its outer end with a valve element 134 adapted to seat on a valve seat 135 in the valve body. The inner end of the valve stem 133 seats on the seat 129 and controls the exhaust port for the chamber 130. The valve stem 128 acts on lever 95 and delivers thereto the force of the pressure on the diaphragm.

The section view of Fig. 7 shows the relation of the pressure unit 99 to the pressure unit 100, and the arrangement of the lever 95 and fulcrum 96. As there illustrated, the lever 95 comprises a pair of spaced bars 137 and 138, between which is the fulcrum 96. The fulcrum is supported on a spindle 140 in side frame members 141 and 142. The side frame members are secured together by plates 143 and 144.

The construction of the beam 95, its fulcrum 96, and units 98, 99 and 100, may be as disclosed in the application of Alfred A. Markson, Serial No. 158,728, filed April 26, 1950, and assigned to Hagan Corporation, of Pittsburgh, Pennsylvania.

The value of the pressure established in the diaphragm chamber 130 will conform to the following equations, which illustrate the performance of device 12, as well:

Let:
$A_1$ = the area of diaphragm 102 of unit 97
$P_1$ = the pressure supplied by relay 10 to unit 97
$F_1$ = force of spring 109 acting on diaphragm 102
$A_2$ = area of diaphragm of unit 98
$P_2$ = pressure on diaphragm of unit 98
$A_3$ = area of diaphragm of unit 99
$P_3$ = pressure on the diaphragm of unit 99
$A_4$ = area of diaphragm of unit 100
$P_4$ = output pressure from unit 100 to unit 150 of pressure controller 14
$L_1$ = length of lever arm from fulcrum 96 to points of action on beam 95 of units 97 and 98; and
$L_2$ = length of lever arm from fulcrum 96 to the points of action of units 99 and 100 on beam 95.

Assuming the above, beam 95 is in balance when the sum of the moments of the diaphragm forces on the beam about fulcrum 95 is equal to 0 when:

$$P_2A_2L_1+P_3A_3L_1+F_1L_1-P_1A_1L_1-P_4A_4L_2=0$$

If $L_1=L_2$ and $A_1=A_2=A_3=A_4$, then
$A_2L_1$, $A_3L_1$, $A_1L_2$ and $A_4L_2$ are each equal to K;
$\therefore KP_2+KP_3+K_2F_1-KP_1-KP_4=0$, where $$K_2=\frac{K_1}{L_1}$$

$\therefore KP_4=KP_2+KP_3+K_2F_1$; and
$P_4=P_2+P_3+K_2F_1$.
When $P_2$ is zero gauge, $P_4=P_3+K_2F_1$.

The pressure output of unit 100 passes through conduit or pipe 13 to the regulator 14. The regulator 14 comprises the pressure diaphragm unit 15 and units 150, 151, and a unit 152. Units 15, 150 and 151 may, for purposes of convenience, be identical to units 98 and 99, while unit 152 may be identical with unit 100, the details of which are shown in Fig. 7. Unit 15 may be supplied with a constant pressure, so that the diaphragm thereof will exert a constant force on the beam 95'. The beam 95' may be like beam 95 of Fig. 2, and supported by a double-acting fulcrum 96'. The force exerted by unit 15 on the beam tends to turn it about its fulcrum in a counterclockwise direction. The pressure delivered to unit 150 acts on beam 95' in a direction opposing the force of unit 15, and tends to turn the beam 95' clockwise.

The output pressure of unit 152 passes through pipe 16, and a by-pass which includes a needle valve 153 and a pipe 154 leading to pressure unit 151. A volume or stabilizing chamber 155 is connected to pipe 154. When the force of unit 150 is such as to open the valve of unit 152, a pressure is transmitted through pipe 16 to the diaphragm-operated valve 17. The pressure gradually leaks through the needle valve 153 to diaphragm unit 151. Therefore, the force developed by diaphragm unit 151 will gradually approach in value the force exerted by unit 152. The needle valve 153 and the volume chamber 155 give automatic reset action to unit 150. The pressure delivered to the diaphragm valve 17 will cause that valve to open and admit more pressure to unit 2, if that is required. Finally, the pressure established in cushion 2 is reflected by error-transmitting relay 12, which reacts on diaphragm unit 150 to readjust valve 17 to a point where the pressure in the "G" cushion 2 is established at the proper value.

If action on the regulator 14, produced by changes in the apparent load on the "G" cushion 2, is in a direction to require a decreased pressure being sent to the diaphragm valve 17, the volume chamber 155, acting through the needle valve 153, will provide such a delaying action on the regulator that valve 17 will be adjusted to the position required to establish the proper pressure in the "G" cushion 2, to maintain that pressure in accordance with the apparent weigth of the pilot on the cushion.

Thus, the system in Fig. 2 provides a means for measuring the total apparent weight of the pilot or other object on an inflatable member, and converting that apparent weight into a pressure signal that is received by a pressure-error transmitter 12 which, in turn, transmits a pressure to a regulator whose function it is to establish a pressure in the "G" cushion in accordance with apparent weight. The error transmitter relay 12 measures the difference between the signal required by the totalizing relay 10 and the actual pressure in the "G" cushion 2, and modifies the operation of regulator 14 in accordance with such differences, to such extent that the proper pressure is maintained in the "G" cushion.

In the modified arrangement shown in Fig. 3, the "G" cushion 2' is supported on a platform 5', as in Fig. 2. Instead of utilizing two thrust-measuring devices 6, only one such device 6' is employed. One end of the "G" cushion platform 5' is supported by a flexible pivot 160, such as a leaf spring. One end of the leaf spring is anchored in a support 161, which would be provided in the aircraft. The thrust-measuring device 6' may, for convenience, be placed under the break of the knees of the pilot. In the system shown in Fig. 3, the totalizing relay 10 is not required because the output of the thrust unit 6' is the only device responsive to the apparent weight on the "G" cushion 2'. Therefore, the output of device 6' may be transmitted directly to the pressure-error transmitter relay 12, which operates in the same manner as the relay 12 of Fig. 2 does. In the system of Fig. 3, the regulator 14 is of the same construction as it is in Fig. 2; therefore, similar and corresponding parts are indicated by similar reference characters.

The pressure output and performance of relay 12 in Fig. 3 follows the equations given below.

Let:
$P_4$ = the pressure supplied to unit 150
$A_5$ = the area of the diaphragm of unit 150
$P_6$ = the pressure supplied to unit 15
$A_6$ = the area of the diaphragm of unit 15
$P_7$ = the pressure of output of unit 152
$A_7$ = the area of the diaphragm of unit 152
$P_8$ = the pressure supplied to unit 151
$A_8$ = the area of the diaphragm of unit 151
$L_1$ = the length of the lever arm from fulcrum 96' to the points of action of the diaphragms of units 150 and 15 on beam 95'; and
$L_2$ = the length of the lever arm from fulcrum 96' to the points of action of the diaphragms of units 152 and 151 on the beam 95'.

If $L_1 = L_2$ and $A_5 = A_6 = A_7 = A_8$, then, in the following equations, $A_5L_1$, $A_6L_1$, $A_7L_2$, and $A_8L_2$ are each equal to K; therefore, beam 95' is in balance when the sum of the moments of the forces of the diaphragms about fulcrum 96' are equal to 0.

$\therefore P_4A_5L_1 - P_6A_6L_1 - P_7A_7L_2 + P_8A_8L_2 = 0;$
$\therefore K_3P_4 - K_3P_6 - K_3P_7 + K_3P_8 = 0;$ and
$K_3P_7 = K_3P_4 - K_3P_6 + K_3P_8;$ $\therefore P_7 = P_4 - P_6 + P_8$ In the equations given for the performance of relay 12, $P_4 = P_3 + K_2F_1$; substituting that value of $P_4$ for $P_4$ in the preceding equation for the value of $P_7$ $$P_7 = P_3 + K_2F_1 - P_6 + P_8$$

Since the performance of regulator 14 is the same in both Figs. 2 and 3, the preceding equations will show that performance and indicate the relationship between the output pressure as delivered to line 16, and the input pressure as delivered by pipe 13 to unit 150.

In the preceding portion of the specification the description has been confined to pneumatic load change responsive mechanism. In Figs. 8, 9, 10 and 11, apparatus is illustrated whereby the load change is measured by what is called an electric strain gauge. One or more strain gauges may be employed as the circumstances require.

Figure 8:
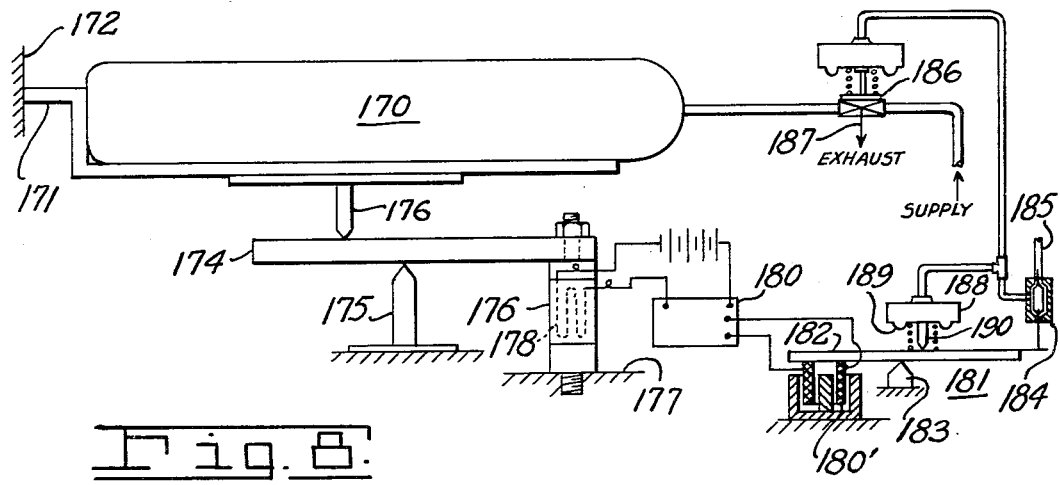
Fig. 8 is a more or less diagrammatic view of a pneumatic G cushion such as shown in Fig. 1 which is provided with electric current or means for detecting apparent weight changes and an electro-magnetic pneumatic convertor for converting the electric output to a pneumatic pressure for adjusting the pressure in the cushion.

In Fig. 8 is illustrated schematically a pneumatic "G" cushion 170 that is supported at one end by a flexible pivot such as a spring 171, one end of which is anchored in a fixed support 172. The free or unsupported end of the cushion is carried by a weigh scale 173. The weigh scale as schematically illustrated, comprises a beam 174 supported on a fixed knife edge fulcrum 175. The thrust of the cushion is transmitted to the beam 174, by means of a strut 176. The free end so-called of the beam 174 is rigidly connected by a metal link 176 to a fixed support 177. As the thrust of the cushion changes, the member 176 will be stressed in tension as the apparent weight on the cushion 170 changes.

Member 176 is provided with an electrical strain gauge 178 that is firmly and rigidly secured to member 176. Strain gauge 178 comprises a length of fine special resistance wire, the resistance of which changes whenever the member 176 is placed under tension or compression. Such gauges are available in the market under the name "Baldwin Strain Gauges." A battery 179 is connected to the strain gauge 178 to control an amplifier 180. The output of the amplifier is supplied to coil 180' of electro-magnetic pneumatic convertor or transducer 181. Current in coil 180' produces a force on a beam 182 which is mounted on a knife edge fulcrum or bearing 183. Movement of the beam results in actuation of an escapement valve 184 to which a source of compressed air at substantially constant pressure is supplied by a pipe 185.

The valve 184 transmits a pressure of varying magnitude, depending upon the intensity of the current in coil 180' to a diaphragm operated valve 186 that controls the admission of compressed air to or the bleeding of air from the cushion 170. Air released from the cushion escapes through the exhaust 187 of the valve 186. The operating pressure transmitted to valve 186 is also communicated to a pneumatic balancing device 188, which is provided with a diaphragm 189 that exerts through a push rod 190, a force on beam 182 that balances the force exerted by the coil 180' on the beam.

The construction of device 181 is illustrated more in detail in Fig. 11. As shown in Fig. 11, coil 180' thereof is secured to the beam 182 and extends into an annular air gap 191 of a permanent magnet 192. The permanent magnet 192 comprises a cup-shaped member 193 of magnetic steel that embraces the coil 180' and is provided with a central core member 194 composed of an alloy that will provide strong, permanent magnetic properties. Core 194 may be made of an alloy known in commerce as "Alnico." Since the permanent magnet has a strong field, changes in current in coil 180' will result in a force being developed on beam 182 that is proportional to the magnitude of the current.

Valve 184 comprises a body 195 having therein a valve element 196 provided with cone pointed ends which control inlet and exhaust ports 197 and 198, respectively. The position of the ends of member 196 relative to the inlet and exhaust ports 197 and 198 determines the magnitude of the pressure delivered by the valve to the balancing device 188. The diaphragm of the valve 186 which receives pressure from valve 184 operates against a spring 199 so that the valve will take a definite position for each value of pressure delivered thereto.

In Figs. 9 and 10, there is illustrated an arrangement for protecting delicate instruments or other sensitive mechanism when crated for shipment. As there shown, a delicate instrument 200 is placed within a pneumatic cushion 201, that is supported within a crate 202 that may be of any suitable form of construction. The cushion bears on all six sides against bearing plates 203—208 respectively, whereby the cushion is provided with a plate on the top and bottom and the four sides thereof. Each plate is provided with a pair of yieldable members 210 that engage the sides and the top and bottom of the crate. Members 210 may be in the form of rubber bumpers or the like. Between the bumpers are located relatively rigid members 211 which may be of steel that will yield under tension or compression. Each member 211 may be initially stressed by means of a bolt 211' that bears against the outer end of each member. On members 211, electric strain gauges 212 are secured. Each strain gauge may be provided with a battery 213 and, as shown in Fig. 11, connected in series to the amplifier 180, the output of which supplies coil 180'. As any one or several of the strain gauges are affected by compression or tension in members 211, the resistance changes, thereby changing the input to the amplifier and the magnitude of the current supplied coil 180'. The magnitude of the pressure delivered to the cushion is thereby changed as required by the thrust on cushion 201.

As shown in Fig. 11, each strain gauge includes fine resistance wire 215, having the physical properties that cause its resistance to change as the wire is stressed either in tension or compression. The wire is secured to a base 216 which may be of special paper or a resinous material such as Bakelite. The base or coating 216 with its embedded resistance 215 is secured to its associated member 211 as shown in Figs. 9 and 10.

From the foregoing it will be seen that the invention may be carried out on a completely pneumatic basis or it may be practiced with electrical strain gauges in combination with an electro-magnetic pneumatic convertor or transducer for controlling the pressure in a cushion in accordance with the apparent load thereon at any instant.

Having thus described the invention, it will be apparent to those of ordinary skill in the art to which the invention pertains that various modifications and changes may be made in the illustrated embodiment without departing from either the spirit or the scope of the invention.

Therefore what is claimed as new and desired to be secured by Letters Patent is:

1. A pneumatic "G" cushion for supporting a pilot of aircraft having high rates of acceleration, and provided with means for controlling the pressure in the cushion in accordance with changes in the apparent weight of the pilot on the cushion, said means comprising mechanism for measuring the weight of the pilot on the cushion as affected by acceleration, and developing an output pressure that is proportional to such weight, means for supplying a pressure medium to the cushion, and regulating means responsive to the pressure in the cushion and to the output pressure of said weight-measuring mechanism, for developing a pressure output that is the function of the relation of said cushion pressure to the pressure output of said weight-measuring mechanism, for establishing a pressure in said cushion that is a function of the relation of said pressure outputs.

2. In combination, an inflatable cushion for supporting a pilot of aircraft, means for supporting the cushion, means for measuring the apparent weight on said cushion as affected by acceleration, a supply of compressed air for said cushion, a regulator for adjusting the pressure in the cushion, and means responsive to the apparent weight on said weight-measuring means for so controlling said regulator that the cushion pressure is adjusted in accordance with the apparent weight.

3. A combination according to claim 2, characterized by the fact that means are provided which are responsive to the difference between the cushion pressure and the weight as measured by the weight-measuring means, and adapted to modify the operation of the regulator in accordance with said difference, thereby to maintain a definite predetermined relationship between the cushion pressure and the apparent weight on the cushion at any instant, as affected by acceleration.

4. A pneumatic "G" cushion in accordance with claim 1 in which the means for measuring the apparent weight of the pilot comprises a pair of thrust-responsive devices on which the cushion is supported at spaced points, each of said devices comprising a housing having a diaphragm on which the thrust of the cushion is received, and valve means actuated by deflection of the diaphragm for establishing a pressure in the housing sufficient to balance the thrust on the diaphragm, and that means are provided for developing a total weight output pressure that is proportional to the sum of the pressures established by the valve means of said thrust responsive devices as a measure of the total weight on said cushion, and that the regulating means responds to said total weight output pressure and to said cushion pressure.

5. A pneumatic "G" cushion in accordance with claim 1 in which a flexible pivot support is provided for one end of the cushion, and that a thrust-measuring device supports the cushion at a location spaced from said pivot, said thrust-measuring device comprising a housing having a diaphragm on which the thrust is received, and valve means actuated by deflection of the diaphragm for establishing a pressure in the housing sufficient to balance the thrust on the diaphragm, and that the regulating means responds to the pressure developed in said housing and to said cushion pressure.

6. The combination as set forth in claim 2, in which the means for measuring the apparent weight on the cushion comprises a pair of spaced thrust-responsive devices on which the cushion is supported at spaced points, each of said devices comprising a housing having a diaphragm on which the thrust is received, and valve means actuated by deflection of the diaphragm for establishing a pressure in the housing sufficient to balance said thrust on the diaphragm, and that means are provided for developing a total weight output pressure that is proportional to the sum of the pressures established by the valve means of said thrust responsive devices as a measure of the total weight on said cushion, and that the regulating means responds to said total weight output pressure and to said cushion pressure.

7. The combination as set forth in claim 2, characterized by the fact that means are provided which are responsive to the apparent weight-measuring means, and to the pressure in the cushion for causing the regulator to adjust the pressure in the cushion in accordance with the apparent weight on the weight-measuring means and the cushion pressure.

8. A combination according to claim 2, in which the cushion is supported at one end by a flexible support, and at a spaced point from said flexible support by a thrust-measuring device, said thrust-measuring device comprising a housing having a diaphragm on which the thrust is received, and valve means actuated by deflection of the diaphragm for establishing a pressure in the housing sufficient to balance the thrust on the diaphragm, and that means responsive to the difference between the cushion pressure and the pressure developed by said valve means are provided for modifying the operation of said regulator, to maintain a predetermined relationship between the pressure established by said valve means and the pressure established in the cushion by said regulator.

9. In combination, an inflatable cushion for supporting a load, the apparent weight of which changes with changing rates of acceleration while in motion, means for supplying air pressure to the cushion, means responsive to the load on the cushion for developing an electric current output the value of which varies in accordance with changes in apparent weight of the load on the cushion, a regulator responsive to said current output, said regulator having means for developing a variable pneumatic control pressure, and means responsive to said control pressure for balancing the electric output of said load responsive means whereby the pneumatic output control pressure is caused to vary by and in accordance with the electric output of said load responsive means, and valve means controlled by said pneumatic output for adjusting the pressure in said cushion in accordance with the value of the pneumatic control pressure.

10. A pneumatic cushion for supporting a load while subject to varying rates of acceleration, and provided with means for controlling the pressure in the cushion in accordance with changes in the apparent weight of the load on the cushion resulting from said changes in rates of acceleration, said means comprising mechanism responsive to the apparent weight of the load on the cushion as affected by changing rates of acceleration for developing an output signal that is proportional to such weight, means for supplying compressed air to the cushion at a value sufficient to support the load and regulating means responsive to the pressure in the cushion and to the output signal of said weight change responsive means, for developing a control signal output that is a function of the relation of said cushion pressure to the control signal output of said weight responsive means, for establishing a pressure in the cushion that is a function of the relation of said output signals.

11. A combination as in claim 9 in which the means responsive to the load on the cushion for developing an electric output comprises a member adapted to be changed in length in response to compression and tension forces applied thereto and an electric resistance wire secured firmly to said member, the wire changing in length and in total resistance in response to load on said member, a battery connected to said resistance wire, an amplifier in circuit with said resistance and battery, the regulator having an electro-magnetic device responsive to the current output of the amplifier for controlling the operation of the regulator.

References Cited in the file of this patent

UNITED STATES PATENTS

| | | |
|---|---|---|
| 2,325,223 | Brewster | July 27, 1943 |
| 2,649,311 | Hetrick | Aug. 18, 1953 |